United States Patent Office.

JOHN T. HARRIS, OF TYNGSBOROUGH, MASSACHUSETTS.

Letters Patent No. 96,317, dated November 2, 1869.

IMPROVED CATTLE-FOOD.

The Schedule referred to in these Letters Patent and making part of the same.

*To all whom it may concern:*

Be it known that I, JOHN T. HARRIS, of Tyngsborough, in the county of Middlesex, and State of Massachusetts, have invented or discovered a new and useful Composition of Matter for Cattle-Feed; and I hereby declare the following to be a full, clear, and exact description thereof, which will enable others to make and use my invention.

My invention or discovery consists in treating the gluten and saccharine matter, obtained from the maize or Indian-corn plant, and other vegetable substances, and the spent matter from breweries and distilleries, commonly known as mash or grains, and converting these products, with other substances, into a cattle-feed in a solid form for transportation.

I obtain the gluten or saccharine matter from the maize or Indian-corn plant, and other vegetable substances, in the manner described in my specification for treating and utilizing this plant, and reduce it, by evaporation or otherwise, to a semi-liquid state, and, when in this condition, convey it, by any suitable means, into a mixer or pug-mill, into which is introduced, at the same time, herbaceous substances, cut into short lengths, or chaff, such as grass, hay, or straw, or farinaceous substances, in such quantity as will absorb the semi-liquid gluten, or saccharine matter, and form a moist composition of matter.

The pug-mill being in motion, the mass will be thoroughly mixed or blended together, and, while the process of mixing is going on, I add to the mass a proper quantity of aromatic substances, and a sufficient amount of common salt, which acts as a preservative, and also imparts flavor to the mass.

The mass, when thoroughly mixed, is passed to a brick-machine with altered moulds, and pressed into blocks, which are conveyed to a kiln or drying-room, and, when dried, are ready for use and transportation.

The spent matter from breweries and distilleries, after distillation, is conveyed to a centrifugal extractor, of any form, a self-discharging one being preferred, and, by this means, the liquid separated from the solid portion of this spent matter, the liquid portion descending into a tank or receptacle beneath the extractor, to be conveyed, by any convenient means, to an evaporator, for the purpose of reducing this liquid to a semi-liquid state, and to dispose of any alcohol or spirits it may contain. This may also be accomplished in a tank supplied with steam-pipes.

This semi-liquid substance is conveyed into the pug-mill, with the solid portion, that has been before separated from the liquid portion of the spent matter and herbaceous substances, such as straw, hay, grass, &c., cut into short lengths or chaff, by an ordinary straw-cutter, in such quantity as will absorb the liquid portion and form a moist composition of matter, is added.

The aromatic substances, and common salt, in the same quantities, and for the same purposes as hereinbefore stated, are also added, and when the mass is thoroughly mixed and blended together in the pug-mill, it is then passed through the brick-machine, as before described, to form it into blocks, which are conveyed to the kiln or drying-room, to be dried, when they are ready for use or transportation.

I do not confine myself to the use of a pug-mill for mixing or blending the mass together, as this may be done in a vessel constructed of either wood or iron, revolving on an axle, with arms or stirrers, and of conical or other shape, supplied with man-holes, for the inlet and outlet of the material; or it may be done by any other suitable mechanical device. Neither do I confine myself to the use of the brick-machine for pressing and forming the mass, as this may be done by any of the many forms of machinery applicable for this purpose.

I am aware of R. L. Delisser's patent, April 21, 1863, No. 38,220, reissued September 25, 1866, No. 2,365. This is a patent for the manufacture of paper from the fibres of corn by a particular process, the glutenous or nutritive portion being eliminated from the plant by means of a heated alkaline solution, and, as a consequence, a portion of the alkali remains with the glutenous matter after the same is separated from the plant. Practice has shown that when in this condition, the material, when dry, is too hard and solid to be valuable for this purpose. In my invention, the glutenous matter being separated by entirely mechanical means, is utilized in a perfectly pure state.

I desire to embrace in this specification only the cattle-feed herein described, that is to say, made of the gluten obtained as herein described, by purely mechanical means, unmixed with chemical substances, and mixed with farinaceous, vegetable, and other ingredients, as set forth.

I do not claim a cattle-feed where the gluten is extracted by a chemical process, as this is not new.

What I claim as my invention, and desire to secure by Letters Patent, is—

A compound for cattle-feed, composed of gluten, obtained as herein set forth, and compounded with the other ingredients described, in the manner specified.

JOHN T. HARRIS.

Witnesses:
WM. FRANKLIN SEAVEY,
HENRY C. HOUSTON.